United States Patent
Kollar et al.

(10) Patent No.: US 11,967,691 B2
(45) Date of Patent: Apr. 23, 2024

(54) BATTERY COOLER INCLUDING O-RING COMPRESSED BETWEEN PIPE AND RADIAL OUTSIDE WALL OF HEAD PART, AND METHOD OF ASSEMBLING THE SAME

(71) Applicant: Hanon Systems, Daejeon (KR)

(72) Inventors: Jan Gregus Kollar, Skalica (SK); Ricica David, Hruba Vrbka (CZ)

(73) Assignee: Hanon Systems, Daejeon (KR)

( * ) Notice: Subject to any disclaimer, the term of this patent is extended or adjusted under 35 U.S.C. 154(b) by 630 days.

(21) Appl. No.: 17/054,406

(22) PCT Filed: Jun. 28, 2019

(86) PCT No.: PCT/KR2019/007882
§ 371 (c)(1),
(2) Date: Nov. 10, 2020

(87) PCT Pub. No.: WO2020/005008
PCT Pub. Date: Jan. 2, 2020

(65) Prior Publication Data
US 2021/0249711 A1   Aug. 12, 2021

(30) Foreign Application Priority Data

Jun. 29, 2018 (DE) .................. 10 2018 115 804.1
Nov. 9, 2018 (DE) .................. 10 2018 219 171.9

(51) Int. Cl.
*H01M 10/6556* (2014.01)
*F28D 1/053* (2006.01)
(Continued)

(52) U.S. Cl.
CPC ...... *H01M 10/6556* (2015.04); *F28D 1/0535* (2013.01); *H01M 10/613* (2015.04);
(Continued)

(58) Field of Classification Search
CPC ........... H01M 10/6556; H01M 10/613; H01M 10/625; H01M 10/6567; F28D 1/0535
(Continued)

(56) References Cited

U.S. PATENT DOCUMENTS

2002/0138981 A1* 10/2002 Lamich ............... F28D 1/05366
29/890.03
2017/0074601 A1* 3/2017 Bry ....................... F28F 9/0226

FOREIGN PATENT DOCUMENTS

DE  202018102555 U1 * 8/2018
EP  2455697 A1    5/2012
(Continued)

*Primary Examiner* — Sean P Cullen
(74) *Attorney, Agent, or Firm* — Norton Rose Fulbright US LLP; James R. Crawford

(57) ABSTRACT

A heat exchanger, in particular battery cooler, having a pipe which has a pipe end portion that is placed at an open end of the pipe and is widened, at least in part, with respect to the non-widened portion of the pipe that is further away from the pipe end portion, a head part that has an opening and a radial outside wall, wherein the non-widened portion of the pipe fits through the opening. The, a seal which is received by the head part in order to be compressed between the pipe and the radial outside wall of the head part, and a tank component which is connected to pipe end portion via the head part. A method for assembling a heat exchanger is also provided.

13 Claims, 4 Drawing Sheets

(51) Int. Cl.
   *F28D 21/00*     (2006.01)
   *H01M 10/613*    (2014.01)
   *H01M 10/625*    (2014.01)
   *H01M 10/6567*   (2014.01)

(52) U.S. Cl.
   CPC ..... *H01M 10/625* (2015.04); *H01M 10/6567* (2015.04); *F28D 2021/0028* (2013.01); *H01M 2220/20* (2013.01)

(58) Field of Classification Search
   USPC ........................................ 429/120; 165/149
   See application file for complete search history.

(56) References Cited

FOREIGN PATENT DOCUMENTS

| | | | |
|---|---|---|---|
| JP | 2005-121350 A | | 5/2005 |
| JP | 2015127631 A | | 7/2015 |
| KR | 20110032021 A | | 3/2011 |
| KR | 2011097166 A | * | 8/2011 |
| KR | 20110097166 A | | 8/2011 |
| KR | 20110121021 A | | 11/2011 |
| KR | 20170142733 A | | 12/2017 |
| WO | 2018020140 A1 | | 2/2018 |
| WO | WO-2019231209 A1 * | 12/2019 | ........... B21D 35/003 |

* cited by examiner

BATTERY COOLER INCLUDING O-RING COMPRESSED BETWEEN PIPE AND RADIAL OUTSIDE WALL OF HEAD PART, AND METHOD OF ASSEMBLING THE SAME

This application is a national phase under 35 U.S.C. § 371 of International Application No. PCT/KR2019/007882 filed Jun. 28, 2019, which claims the benefit of priority to German Patent Application Nos. 102018115804.1 filed on Jun. 29, 2018 and 102018219171.9 filed on Nov. 9, 2018. The entire contents of these applications are incorporated herein by reference in their entirety.

TECHNICAL FIELD

A current general trend towards electromobility, in the automobile industry, is resulting in a general trend towards high capacity of a battery, high power output, and high current in the electrical system of a vehicle, such as an electric car. Similar trends can be observed in other technical fields in which an increase in electric power provided within a system having restricted dimensions is required. This trend results in particular in an increase in heat energy emitted by the battery and the surroundings thereof. Accordingly, it is necessary to cool batteries of an electric car, or in a similar environment.

BACKGROUND ART

In order to cool the battery or batteries of an electric car or a similar device, battery coolers are generally known in the technical field.

An example of an advantageous battery cooler, to which the present disclosure can be applied, is disclosed in the German patent application DE 10 2018 208 473.4 (HANON SYSTEMS, 95 Sinilseo-ro Daedeok-gu, 306-230 Daejeon-si, KR), filed on 29 May 2018.

The description in DE 10 2018 208 473.4, which relates to the use of a heat exchanger (denoted herein as "battery cooler"), the shape, the dimensions, the material, the coating, and the production of a cooling element or cooling channel (denoted herein as "pipe"), the shape, the dimensions, the material, the coating, and the production of a distributor (denoted herein as "tank component"), the shape, the dimensions, the material, the coating, and the production of a distributor base (denoted herein as "head part"), and the shape, the dimensions, the material, the coating, and the production of a seal (denoted herein as "seal"), is incorporated herein, in each case, by reference.

The present disclosure relates to a battery cooler, such as the battery cooler described for example in DE 10 2018 208 473.4, which makes use of a greatly widened pipe that is inserted between battery cells, the pipe entering into a tank component which is in turn connected to a tube, in order to feed coolant to the pipe. Current designs of such battery coolers require a rather complicated and laborious connection to be formed between the tank component on the one hand and the pipe on the other hand. According to a first aspect of the present invention, an aim is to simplify a connection of the tank component to the pipe. According to a second aspect of the present invention, an aim is to provide a more cost-effective solution compared with previous designs. According to a third aspect of the present invention, the connection between the pipe and the tank component is intended to allow the pipe to be insulated, in particular electrically insulated, by means of a coating that has been applied prior to the pipe prior to assembly, in particular prior to establishing the connection between the pipe and the tank component. A fourth aspect of the present invention is that of providing an alternative design, and a method for assembly with respect to the design, and the method for assembly, which are described in DE 10 2018 208 473.4.

DISCLOSURE

Technical Solution

The present invention is defined by the independent claims, and the dependent claims relate to preferred further features.

According to the present disclosure, the pipe and the tank component are assembled mechanically, without soldering or welding during the assembly process. Firstly, said method is easier to perform during production of the battery cooler. Secondly, the mechanical assembly which does not require any soldering or welding in the actual assembly steps, makes it possible for the pipes to be coated by an (electrical or other) insulation coating which may be temperature-sensitive. In other words: The mechanical assembly according to the present disclosure allows for the pipes to be provided with any coating or to be produced from any material, which could possibly be destroyed or damaged by high temperatures, such as those which occur upon soldering or welding.

According to the present invention, assembly of the pipe and the tank component includes a step of providing the pipe, a step of placing a head part on the pipe, and a step of placing a seal on the pipe.

The seal and head part are placed on the pipe in such a manner that the (free) end of the pipe that is the end to be connected to the tank component via the seal and the head part is accessible for a next step of the assembly method. While the seal and the head part can be placed on the pipe via the end to be connected to the tank component, it is of course also possible to place the seal and the head part on the pipe via the opposite end of the pipe, if available.

According to the present disclosure, the end of the pipe at which the pipe is to be connected to the tank component is placed between the seal and the head part on one side, and (later), the tank component, on the other side.

In a further step, the pipe end to be connected to the tank component is widened. This can be achieved by using a punching knife or a similar object, in order to widen the relevant pipe end. The pipe end can be widened over the entire periphery of the pipe, but it is also possible for the pipe end to be widened only in part. Widening the pipe end over the entire periphery allows for a more reliable connection of the pipe to the tank component.

The amount of the widening of the pipe can be between 0.1 mm and 2.0 mm, in particular in battery coolers for electric vehicles where the mentioned amount for the widening of the pipe is preferred, since it provides on the one hand sufficient stability of the connection between the pipe and the tank component. On the other hand, the widening is not too large, such that the pipe material is not damaged by the widening, and the connection between the pipes and the tank component remains fluid-tight.

The seal can be substantially toroidal in shape, such as an O-ring or a deformed O-ring. That is to say that the seal can be a ring, an oval, a racetrack shape, or deformed in plan view, and, in a cross-sectional view of a portion of the seal it can be circular, oval or deformed. Variations of the shape are possible. In a plan view, the seal can be a circular, an oval, or a racetrack shape, or can even more or less follow the contour of a polygon, in particular a rectangle. With respect to the present disclosure, and taking account of the way in which the seal can grasp the pipe and the head part, the above-mentioned plan view would be a view along the main extension of the pipe, i.e. in parallel with the pipe central axis and on the end to be connected to the tank component.

The seal can be of a size that allows the non-widened pipe to fit into the seal (the circular, oval, or racetrack shape). The pipe can grasp the seal tightly, or can be shaped such that it has to be widened in order to grasp the seal tightly. The pipe end compresses the seal outwards, if the seal is moved towards the pipe end at which the pipe end is sufficiently widened, as described above.

When the pipe end has been widened, the tool for widening the pipe can be removed, and the tank component that is to be fastened to the pipe can be placed on the widened end of the pipe. Previously, subsequently, or at the same time, the seal and the head part can be moved towards the pipe end, in order to contact the tank component. In this way, the head part and the tank component, which interact at the end in order to establish the connection between the pipe and the tank component, move towards one another and ultimately come into contact with one another, the seal being placed between the head part and the tank component, as well as between the head part and the pipe.

When the head part and the tank component are in contact with one another, the widened end portion of the pipe is surrounded by the head part or the tank component or both, and possibly by other elements, such as the seal. In this construction, the seal is compressed between the widened pipe end on the one hand, and the head part on the other hand, in a radial direction with respect to the pipe axis. Furthermore, the tank component contacts the head part, and the head part and the tank component are crimped together. Possible ways for crimping together the tank component and the head part are undulating crimping or lug crimping.

As a result of crimping together the tank component and the head part with the widened pipe end surrounded by the tank component and/or head part and the seal between the head part and/or the tank component and the pipe, a tight connection between the pipe and the tank component is provided.

According to a preferred embodiment of the present disclosure, the tank component, which is placed on the widened pipe end at least in part, is designed such that it has a shape which allows the pipe to abut the tank component. For example, the tank component can comprise a recess for receiving the widened pipe end, it being possible for the recess to have an inner step, a flange, or a similar element, or a shape for abutting the end of the pipe. It is therefore ensured that, following the connection between the pipe and the tank component, the pipe cannot be pressed into the tank component. Furthermore, this allows for a clearly defined end position to be provided, in which position the pipe end is correctly inserted into the tank component. In this position, the crimping of the tank component and of the head part can be performed, and the risk of production errors, inaccuracies and, as a possible consequence, failure of the device can be reliably prevented.

Furthermore, the head part can be shaped and dimensioned such that it rests tightly on the non-widened pipe and is movable along the pipe axis. The shape and size of the head part can be selected such that the widened pipe end is prevented from moving through the head part. In other words: An opening of the head part for receiving the pipe can be dimensioned such that it is too narrow for the widened pipe end to move through the opening, but allows the non-widened pipe end to move through the opening.

This reliably prevents the pipe from separating from the tank components. In addition or as an alternative to said design of the head part and of the pipe, the seal can also be designed accordingly, such that it provides sufficient force to securely retain the connection between the tank component and the pipe. In this respect, the seal can be designed such that it exerts a radial compression force on the pipe, and said radial compression force can be selected such that it is large enough for the widened pipe to be unable, under realistic circumstances, to be pulled out of the connection between the pipe on the one hand and the tank component and/or the head part on the other hand.

Advantageous Effects

The method set out allows for a relatively cost-effective, simple, but nonetheless very reliable type of connection of the pipe of a battery cooler or a similar device on the one hand and a tank component or another end or terminating element on the other hand. Furthermore, since the method is a purely mechanical assembly method, without significant influence of heat, it is possible to provide a coating on the pipe prior to the assembly, allowing for the coating on the pipe to be provided in a significantly more efficient manner.

DESCRIPTION OF DRAWINGS

In the following, an example of the above concept, which is shown in the following figures, is described.

BEST MODE

In the following, FIG. 1 to FIG. 12 are described in greater detail, as an example or an embodiment of the concept explained in the above description of the invention. It is noted that the same reference signs are used for the same elements, throughout the description of the embodiment and of the method shown in FIG. 1 to FIG. 12.

Figure 1:
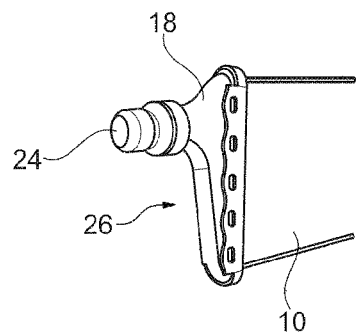
FIG. 1 shows the completed module consisting of a pipe and a tank component.

FIG. 1 shows a module 26 consisting of a pipe 10 and a tank component 18. The tank component comprises a tank opening 24 through which a fluid for cooling a battery or other devices can be fed into the pipe 10.

Figure 2:
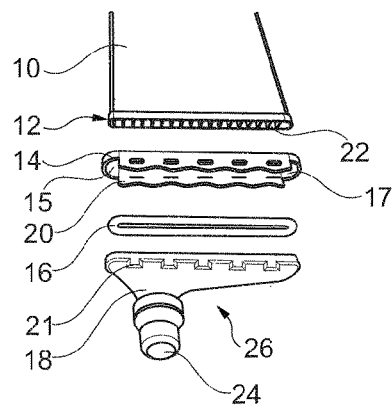
FIG. 2 is an exploded view of the elements to be assembled for the module from FIG. 1.

FIG. 2 is an exploded view of the module 26 from FIG. 1. As is clear from FIG. 2, the pipe 10 has a pipe end portion 12 in order to be connected to the tank component 18. Said pipe end portion 12 is placed at an open end of the pipe 10 and is widened with respect to the portion of the pipe 10 that is further downstream, i.e. remote from the open end. The pipe 10 has a flat structure and comprises a plurality of individual pipe portions, in this example eighteen individual pipe portions, each of which has an individual opening 22 at the pipe end portion 12, and the pipe portions being formed integrally in order to form the pipe 10. In the present embodiment, the pipe portions are dimensioned such that they have a substantially quadratic cross section. While it is not always possible to determine, from outside the pipe 10, the number of pipe portions within the joint outside wall of the pipe 10, the present disclosure can be used for many different types of pipe 10. In particular, the flat structure comprising a plurality of pipe portions which are arranged opposite one another and each of which is an individual pipe, as in the present invention, is a preferred structure, since it makes it possible for a large quantity of coolant to be conducted along the battery to be cooled, and as a result allows for a very efficient heat transfer between the element to be cooled, for example the battery, and the cooling medium. However, it is of course possible for more or fewer pipe portions to be used in the pipe 10. It is also possible for the pipe portions to be of other shapes and dimensions, and the present disclosure is also applicable to an individual pipe, i.e. a pipe in which the outside wall is the only wall of the pipe, without a plurality of pipe portions being formed inside the pipe or inside the outside wall.

FIG. 2 furthermore shows a head part 14 comprising a head part crimped portion 20 that is integral with the head part 14. The dimensions of the head part 14 are such that a portion of the pipe 10, specifically the non-widened portion of the pipe 10, is allowed to pass through an opening 15 of the head part 14 and receive a seal 16 around the opening 15 which is intended to surround the pipe 10 and to be surrounded by a radial outside wall 17 of the head part 14, such that it is compressed between the pipe 10 and the radial outside wall 17. The seal 16, which is surrounded by the outside wall 17 of the head part 14, and the pipe 10, which is surrounded by the seal 16 and rests in the opening 15 of the head part 14, are described in more detail in the following, and are shown in some of the following figures.

FIG. 2 furthermore shows the tank component 18 which is intended to be crimped to the head part crimped portion 20. For this purpose, the tank component 18 has a tank crimped portion 21 that is designed such that, i.e. has such dimensions and is shaped such that it interacts with the head part crimped portion 20 in order to enter into an interlocking connection. The embodiment shown in the figures of the present application represents an undulating crimped connection between the head part and the tank component 18.

Figure 3:
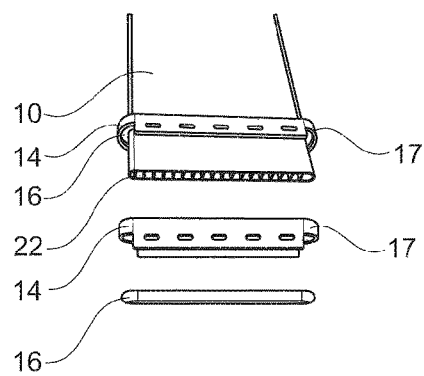
FIG. 3 shows some of the elements from FIG. 2, in a step of an assembly method.

FIG. 3 shows an assembly step of the module shown in FIG. 1. In this step, the head part 14 is placed on the pipe 10 such that it surrounds the pipe 10 and is moved away from the open end of the pipe 10 that is intended to be connected to the tank component 18, in order to make said end of the pipe 10 accessible for further method steps. The seal 16 is also placed on the pipe 10 such that it surrounds the pipe 10 and is received by the head part 14. As a result, the seal 16 is placed between the pipe 10 and the head part 14, more precisely the outside wall 17 of the head part 14, in a radial direction with respect to the pipe axis. FIG. 3 shows the head part 14, the seal 16, and the partially assembled structure of the pipe 10, the head part 14 and the seal 16. FIG. 3 also shows the pipe openings 22 of the pipe portions of the pipe 10, and it is clear from FIG. 3 that, when the seal 16 and the head part 14 are placed on the pipe 10, the end of the pipe that is intended to be connected to the tank component 18 is not yet widened, but is approximately the same diameter as the rest of the pipe 10. Said diameter of the end of the pipe is dimensioned such that it allows the head part 14, in particular the opening 15, and the seal 16, to receive and surround the pipe 10, from the free end of the pipe, in a fitting manner.

Figure 4:
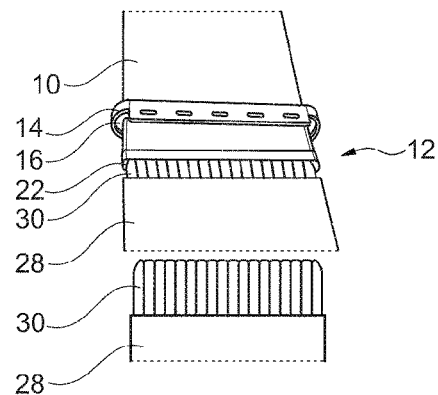
FIG. 4 shows elements for a further step of the assembly method.

FIG. 4 shows a tool 28, for example a punching knife, which can be used for widening the end of the pipe 10 that is intended to be connected to the tank component 18, and in the process forms the widened pipe end portion 12. As is clear from FIG. 4, the tool 28 comprises a plurality of projections 30 which can be introduced into the pipe openings 22 at the free ends of the pipe 10. In the embodiment shown in the figures of the present application, the pipe 10 comprises eighteen pipe portions. Accordingly, the tool 28 comprises eighteen projections 30, each of the projections 30 being of such a size and being arranged such that it is pressed into one of the openings 22 of the pipe, such that each of the openings 22 receives a projection 30 and is radially widened, such that it forms the widened pipe end portion 12, after the seal 16 and the head part 14 have been pushed over the free end portion of the pipe 10.

Accordingly, FIG. 4 also shows the widened pipe end portion 12, i.e. the portion of the pipe 10 that is to be connected to the tank component 18.

Figure 5:
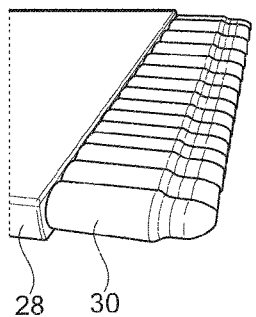
FIG. 5 shows a tool for widening a pipe end, which is connected to the tank component.

FIG. 5 is a further view of the tool 28 and the projections 30 thereof. As is clear from FIG. 5, the projections have a tapering structure, in which the free ends of the projections 30, which are to be inserted into the openings 22 of the pipe 10, have a smaller diameter than the ends of the projections 30 at which the projections 30 are attached to a common base of the tool 28.

In the structure shown in FIG. 5, the projections 30 taper in a stepwise manner. That is to say that there is a first taper or widening, or a first truncated cone, which starts having a small diameter (smaller than the diameter of the opening 22) and ends having a diameter which can be for example the same diameter as or a similar diameter to the corresponding opening 22 in the pipe 10. Said truncated cone facilitates the insertion of the projection 30 into the opening 22 of the pipe 10. Further away from the free end of the projection 30 there may be a second taper or widening, for widening the pipe opening 22 and the end of the pipe 10, if the projection 30 is inserted further into the pipe 10. Further away from the free end of the projection 30, the projection can be cylindrical, i.e. not tapering or widening, in order to form a widened pipe end portion 12 that has the same diameter along the pipe axis.

The widening of the pipe 10, more specifically of the widened pipe end portion 12, can be performed up to an amount of between 0.1 mm and 2.0 mm, in particular for structures of the pipe 10 that are used for cooling automobile batteries, for example for electric cars.

Figure 6:
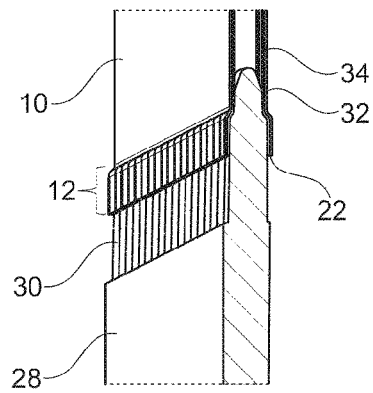
FIG. 6 also shows the tool shown in FIG. 5, which widens the end of the pipe to be connected to the tank component.

FIG. 6 shows the tool 28 and projections 30 when they are inserted into the free end of the pipe 10, each of the openings 22 receiving one of the projections 30 of the tool 28. In this way, the widened pipe end portion 12 is formed. The widened pipe end portion 12 is formed by plastic deformation (of pipe portions) of the pipe 10.

As is furthermore clear from FIG. 6, the pipe 10 is a multi-layer pipe. A pipe base 34 is produced from a first material and can be used as a basis for a coating 32 that is provided on the outside wall of the pipe 10. The coating 32 can for example be an insulation coating, for example a particularly helpful electrical insulation coating if the pipe 10 is used for cooling batteries, which coating is already provided on the pipe 10 before the pipe 10 is connected to the tank component 18 or other devices. Since the method according to the present invention does not require any soldering or welding steps, which are naturally associated with high temperatures, and which could damage or even destroy the coatings, it is possible to apply temperature-sensitive coatings 32 to the base 34 of the pipe 10 before the connection between the pipe 10 and the tank component 18 is provided. This makes it possible to significantly reduce the outlay for providing a coated battery cooler or another pipe which is connected to a tank component 18. In other words: The present invention makes it possible to provide modules having coated pipes at comparatively low costs.

Figure 7:
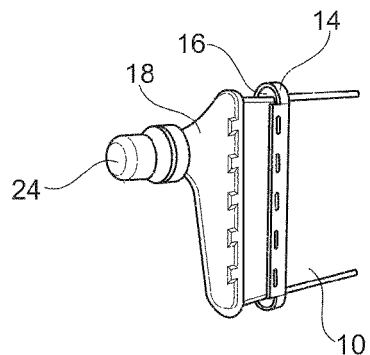
FIG. 7 shows the elements from FIG. 2 in a further step of the assembly method.

FIG. 7 shows a further step of the assembly method according to the present disclosure. The pipe 10 is provided with the seal 16 and the head part 14, and the widened pipe end portion 12 has been formed for example by the tool 28 that is shown in FIG. 5 and FIG. 6 and described above.

After the tool 28 has been removed, the end portion 12 of the pipe 10 retains the widened design thereof. In other words: The widened pipe end portion 12 is formed by plastic deformation (of the pipe portions) of the pipe 10, and does not return to the original size thereof after the tool 28 is removed. After the tool 28 has been removed from the end portion 12 of the pipe 10, the tank component 18 is placed on the widened pipe end portion 12, at least in part. The tank component 18 receives the widened pipe end portion 12, at least in part, such that an interior of the tank component 18 allows for the tank opening 24 to be in fluidic connection with the openings 22 (of the pipe portions) of the pipe 10.

Figure 8:
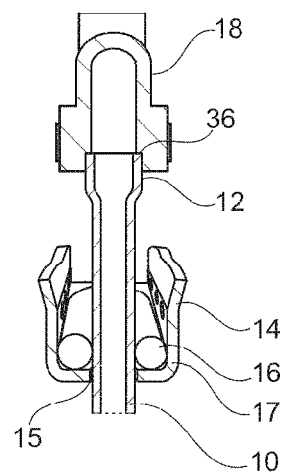
FIG. 8 is a sectional view of the elements in the step illustrated in FIG. 7.

FIG. 8 is a sectional view of the structure from FIG. 7. As is clear from FIG. 8, the widened pipe end portion 12 is received in the tank component 18 in part, and abuts an inner step 36 (which will be described in greater detail below) of the tank component 18. When the tank component 18 comes into abutment at the end of the pipe 10, the head part 14 and the seal 16 can be moved towards the tank component in order to come into contact with the tank component 18 and to be crimped thereto.

Figure 9:
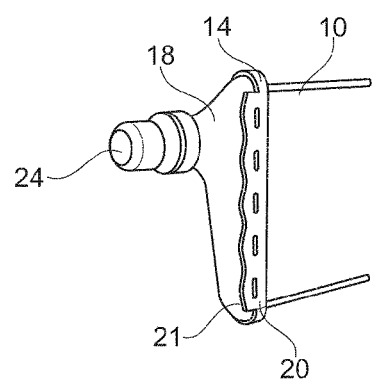
FIG. 9 shows the elements from FIG. 2 in a further step of the assembly method.

FIG. 9 shows a structure of the pipe 10, the head part 14 that includes the seal 16, and the tank component 18, in an assembled state as shown in FIG. 1. As is clear from FIG. 9, the head part crimped portion 20 and a tank crimped portion 21 form an undulating crimped connection, and therefore an interlocking connection. As an alternative or addition to the undulating crimped connection, a lug crimped structure is also possible for the present disclosure. By crimping the head part 14 to the tank component 18, a tight connection, which is at least fluid-tight within the meaning of the requirements for fluid-tightness in the present technical field, is achieved.

Figure 10:
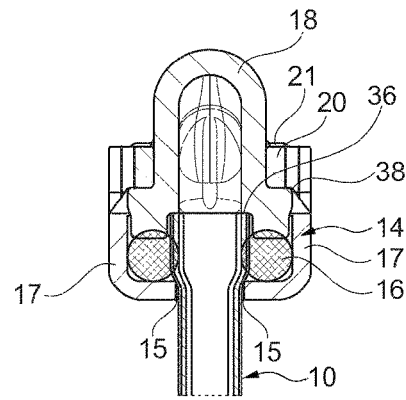
FIG. 10 is a sectional view of the elements in the step illustrated in FIG. 9.

FIG. 10 is a cross-sectional view of the assembled structure of the head part 14 and the tank component 18. As is clear from FIG. 10, the tank crimped portion 21 and the head part crimped portion 20 are placed side-by-side, such that it is possible to crimp the head part crimped portion 20 to the tank crimped portion 21. As a result, the head part 14 is tightly connected to the tank component 18. FIG. 10 shows an outer step 38 which, when the head part 14 and the tank component 18 are in the assembled structure, provides an interlocking connection for the head part crimped portion 20, which is formed as an undulating crimped connection. In other words: The head part crimped portion 20 is not only crimped to the tank crimped portion 21, but rather an interlocking connection is also provided by the outer step 38 and the head part crimped portion 20.

There is an inner step 36 in the interior of the tank component 18, to which step reference has been made above, in connection with the abutment of the end of the pipe 10 to be received in the tank component 18. Furthermore, it is clear from FIG. 10 that the seal 16 is clamped between the outside wall 17 of the head part 14 on the one hand and the widened pipe end portion 12 on the other hand. The seal 16 is also clamped between a wall at the axial end of the head part 14 and the tank component 18. In this way, a tight and secure connection between the pipe 10 and the tank component 18 is provided.

Figure 11:
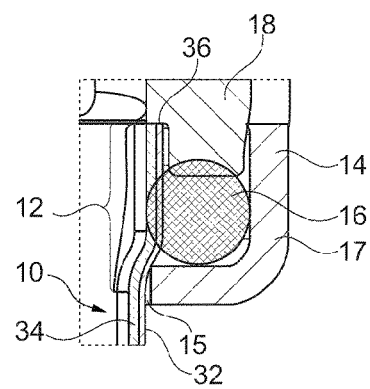
FIG. 11 is an enlarged view of a part of the drawing from FIG. 10.

FIG. 11 is a further enlarged view of the module in the assembled structure. The widened pipe end portion 12 is shown, and compresses the seal 16 with respect to the radial outside wall 17 of the head part 14. The seal 16 is shown such that it overlaps the widened pipe end portion 12. In the assembled state, the seal 16 is deformed, such that it fits between the widened pipe end portion 12 and the radial outside wall 17, and between the axial outside wall of the head part 14, and the tank component 18. It is clear from FIG. 11 that the pipe 10 comprises a pipe base 34 on which a coating 32 is formed before the pipe 10 is deformed, in order to form the widened pipe end portion 12, and before the pipe 10 is connected to the tank component 18 via the head part 14 and the seal 16.

Figure 12:
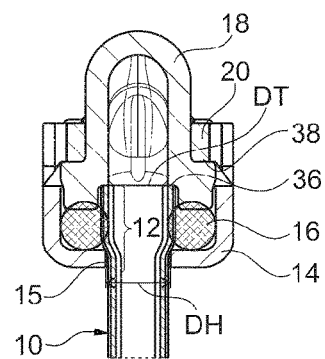
FIG. 12 shows aspects of the fully assembled connection of the pipe and the tank component, as shown in FIG. 10.

FIG. 12 is a further sectional view of the structure from FIG. 9 to FIG. 11. In FIG. 12, "DT" describes the outside diameter of the pipe 10 in the widened pipe end portion 12. "DH" describes the diameter of the opening 15 of the head part 14, through which the pipe 10 is guided into the inside of the tank component 18.

It is clear that the outside diameter DT of the pipe 10 is larger than the diameter DH of the opening 15, such that an interlocking connection is formed, as a result of which the pipe 10 cannot be pulled out of the head part 14. The inner step 36 ensures that the pipe 10 cannot be pushed further into the tank component 18, and the relative positions of the tank component 18 on the one hand, and the head part 14 on the other hand, are fixed by the outer step 38, the head part crimped portion 20, the tank crimped portion 21, and the restoring force of the seal 16 between the wall at the axial end of the head part 14 on the one hand and the tank component 18 on the other hand.

The figures of the present application represent a particularly preferred embodiment of a pipe and tank component module, and a method for mechanical assembly of the pipe and tank component, which module or method makes it possible to connect the pipe and the tank component without any soldering or welding steps. This disclosure provides a cost-effective and reliable production method, and at the same time allows for a temperature-sensitive material, in particular a coating, to be applied to the pipe 10 or other elements of the module before the assembly method has ended, which increases the reliability and reduces costs.

INDUSTRIAL APPLICABILITY

The present invention provides a battery cooler for cooling batteries of an electric car or similar environment.

What is claimed:

1. A heat exchanger, comprising:
   a pipe which has a widened pipe end portion that is placed at an open end of the pipe, at least in part, with respect to a non-widened portion of the pipe that is further away from the pipe end portion, a head part that has an opening and a radial outside wall, wherein the non-widened portion of the pipe fits through the opening, a seal which is received by the head part and is compressed between the pipe and the radial outside wall of the head part, and a tank component which is connected to the pipe end portion via the head part, wherein the seal is an O-ring, wherein the tank component comprises an inner step or a flange for coming into abutment on the widened pipe end portion, so that the pipe is prevented from being pushed into the tank component.

2. A heat exchanger according to claim 1, wherein the seal is deformed, in a plan view, such that the seal has an oval shape, a racetrack shape, or a polygonal shape.

3. A heat exchanger according to claim 1, wherein the seal is constructed such that the seal applies a radial compression force to the pipe when the head part and the tank component are crimped together.

4. A heat exchanger according to claim 1, wherein the pipe is composed of a plurality of pipe portions which each have a pipe opening at the pipe end portion.

5. A heat exchanger according to claim 1, wherein the pipe is flat.

6. A heat exchanger according to claim 1, wherein the tank component comprises a recess for receiving the widened pipe end portion.

7. A heat exchanger according to claim 1, wherein the inner step or the flange for abutment on the widened pipe end portion is provided inside a recess for receiving the widened pipe end portion.

8. A heat exchanger according to claim 1, wherein the opening of the head part is too narrow for the widened pipe end portion to move through the opening but allows for the non-widened portion of the pipe to move through the opening.

9. A heat exchanger according to claim 1, wherein the head part comprises a head part crimped portion and wherein the tank component has a tank crimped portion.

10. A heat exchanger according to claim 9, wherein the tank crimped portion interacts with the head part crimped portion.

11. A method for assembling a heat exchanger, said method comprising the following steps:
providing a pipe which has a pipe end portion that is positioned at an open end of the pipe;
placing a head part, which has an opening and a radial outside wall, on the pipe, such that the pipe fits through the opening of the head part;
placing a seal, which is an O-ring, on the pipe, such that the seal is received by the head part between the pipe and the radial outside wall;
widening the pipe end portion at least in part;
placing a tank component on the widened pipe end portion, such that the tank component is in contact with the head part, wherein the seal is placed between the head part and the tank component, and
crimping together the head part and the tank component, wherein the widened pipe end portion is surrounded by the tank component and/or by the head part,
wherein the tank component comprises an inner step or a flange which is capable of coming into abutment on the widened pipe end portion so that the pipe is prevented from being pushed into the tank component.

12. A method according to claim 11, wherein the pipe end portion is widened by insertion of a punching knife through the pipe end portion and into the pipe.

13. A method according to claim 11, wherein the heat exchanger comprises:
the pipe which has the pipe end portion that is placed at the open end of the pipe and is widened, at least in part, with respect to a non-widened portion of the pipe that is further away from the pipe end portion,
the head part that has the opening and the radial outside wall, wherein the non-widened portion of the pipe fits through the opening,
the seal which is received by the head part is compressed between the pipe and the radial outside wall of the head part, and
the tank component which is connected to the pipe end portion via the head part,
wherein the seal is the O-ring.

* * * * *